United States Patent
Lungu

(10) Patent No.: US 6,914,362 B2
(45) Date of Patent: Jul. 5, 2005

(54) CONSTRUCTION AND MODE OF OPERATION OF OPPOSITE STATORLESS ELECTRONICALLY SWITCHED MOTORS

(76) Inventor: Iancu Lungu, Str. Trapezului nr. 5G1A ap-40, RO-74381 Bukarest 3 (RO)

( * ) Notice: Subject to any disclaimer, the term of this patent is extended or adjusted under 35 U.S.C. 154(b) by 70 days.

(21) Appl. No.: 10/348,178

(22) Filed: Jan. 16, 2003

(65) Prior Publication Data

US 2003/0127939 A1 Jul. 10, 2003

Related U.S. Application Data

(63) Continuation of application No. PCT/RO00/00009, filed on Apr. 21, 2000.

(30) Foreign Application Priority Data

May 26, 1999 (RO) .............................. 99-00603

(51) Int. Cl.[7] .............................................. H02K 13/02
(52) U.S. Cl. ........................ 310/219; 310/143; 310/232; 310/136; 310/138; 310/150
(58) Field of Search ................................. 310/219, 232, 310/143

(56) References Cited

U.S. PATENT DOCUMENTS

| | | | | | |
|---|---|---|---|---|---|
| 5,281,880 | A | * | 1/1994 | sakai | 310/115 |
| 5,550,418 | A | * | 8/1996 | Chung | 310/239 |
| 6,586,858 | B1 | * | 7/2003 | Finkle | 310/233 |

* cited by examiner

Primary Examiner—Nicholas Ponomarenko
Assistant Examiner—Iraj A. Mohandesi
(74) Attorney, Agent, or Firm—Kelly Bauersfeld Lowry & Kelley, LLP

(57) ABSTRACT

The invention relates to the construction and a mode of operation of statorless electronically switched DC motors that have two freely turning rotors. The invention also relates to embodiments of the invention regarding the bearings, the circuit design and the mode of operation of machines such as fans and blowers.

19 Claims, 3 Drawing Sheets

CONSTRUCTION AND MODE OF OPERATION OF OPPOSITE STATORLESS ELECTRONICALLY SWITCHED MOTORS

This application is a continuation of PCT/RO00/00009 filed Apr. 21, 2000.

This invention relates to brushless direct current motors without commutating brushes and without stator. These motors are electronically switched motors and consist of two rotors which are freely movable in opposite direction, whereby these rotors are generally configured as inner or as outer rotor so that the magnetic field acts through a cylindrical air gap. Such a motor is known from the international application PCT-RO 00012/95.

The invention can also be applied to motors with plane axial air gap. One of the rotors, called hereunder "field rotor 1", is active, whereby it conducts current, the effect of the current conduction creating a rotating magnetic field due to field coils. The other rotor, called hereunder "secondary rotor 2", is passive and consists of a bundle of laminations, as usual for reluctance motors (SR motors). For other motor construction types, this rotor can also be configured as a motor with permanent magnets.

Each electronically switched motor can be transformed into a motor according to the invention, when the present stator can rotate freely by means of additional bearings 31, 32 and thus becomes a field rotor. The opposite rotors are accordingly fixed on a carrier with bearings and are supplied with plus or minus current over two rotating contacts over two brushes.

The switching electronics of the motor 13 belongs to the field rotor and rotates accordingly together with it.

The control electronics 143 can be mounted either on the frame 14 of the field rotor 1 (FIG. 5b), or outside thereof, whereby it cooperates with the switching electronics 15 by electroplating contact (additional brushes) or by magnetic or optical coupling. These motors supply the useful effect over two opposite rotors which are loaded with the same torque, whereby their number of revolutions can be different. Therefore, it is necessary that the invention also offers the skilled in the art the solutions for the application of this unusual motor type. This is the condition for the realization of technically and economically competitive working units.

The aim of this invention is thus to offer experts in the field of electronically switched motors or experts in the field of working devices (especially ventilators) alternatives for solutions of embodiments so that they can realize optimized working units.

This is also necessary to allow an appropriate cooperation of experts of different specialities because without an understanding of the whole device each person skilled in the art could tend to apply traditional solutions which do not lead to optimal results.

The aim of this invention is achieved in claim 1 and is concretized in further individual alternatives which correspond to the subclaims.

BRIEF DESCRIPTION OF THE DRAWINGS

The accompanying drawings illustrate the invention. In such drawings:

FIG. 5b: Shows the configuration of the opposite motor operating two ventllators 19, 29 In parallel by means of rotors 1, 2 and a belt 241.

DETAILED DESCRIPTION OF THE PREFERRED EMBODIMENT

Figure 1:
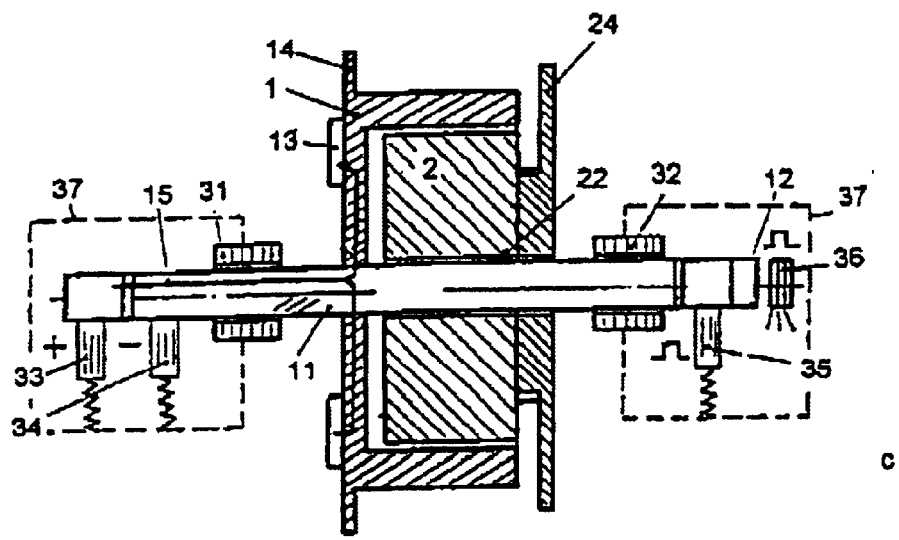
FIG. 1a: Shows a construction alternative of the opposite motor with an inner rotor arrangement and with carrier bearings 31, 32 fixed on both sides of the rotors.
FIG. 1b: Shows a construction alternative of the opposite motor with an inner rotor arrangement and with carrier bearings 31, 32 fixed only on one side.
FIG. 1c: Shows a contruction alternative of the opposite motor with rotors separated by an axial air gap and with carrier bearings 31, 32 fixed only on one side.
Figure 1:
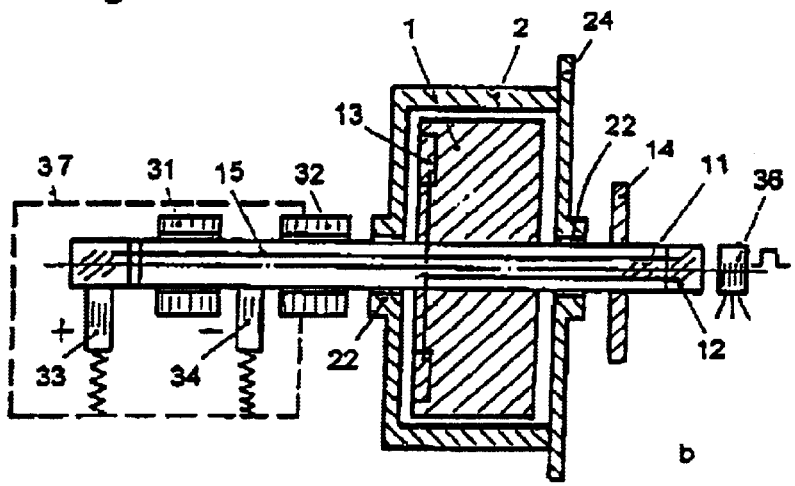
Figure 1:
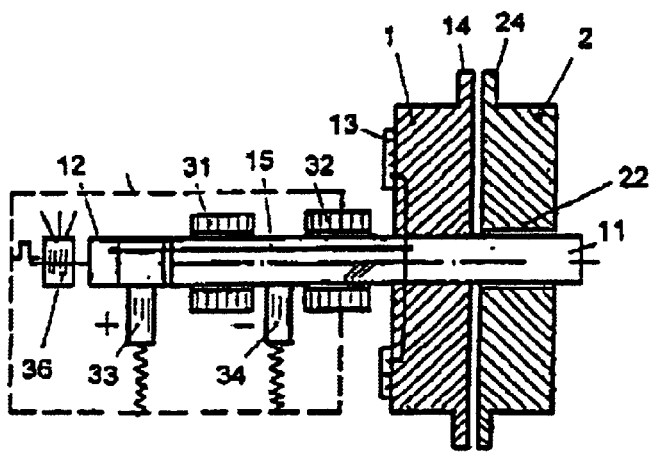

The parts which are driven by the rotor 1 and which rotate with it in one direction are represented in the drawings by left inclined hatching and have reference numerals which begin with the number 1 and those which rotate with the rotor 2 in opposite direction are represented by right inclined hatching and by numbers beginning with 2. The non rotating parts are represented by vertical hatching, eventually by crossed haching and have reference numerrals which begin with 3.

Should no hatching exist, the beginning number of the reference numeral shows the type of motion. The power connections (brushes) are indicated with (+) or (−) and the control parts are represented by a logic stage (high/flow).

FIGS. 1a, b, c represent three construction alternatives of an opposite motor which are respectively derived from the concepts of former motors with an inner rotor (a), an outer rotor (b) of a former motor with an axial air gap (c). The reference numerals of all three drawings designate parts with the same function according to the above mentioned rules, as follows.

1 represents the field rotor (with windings).

11 is a hollow shaft through which the power connections or the control lines are guided and which is connected with the field rotor.

12 is a contactless sensor (magnetic or optical).

13 are power semiconductors which control the rotating field of the field rotor.

14 is a flange to which the driven device is mechanically coupled which belongs to the multifunctional motor frame.

15 is a line which represents the path of the power lines or control lines (through the hollow shaft 11 or the field rotor 1).

16 is a Hall sensor which determine the rotor position, 2 represents the following rotor (with or without magnets)

22 is the bearing which belongs to this rotor which serves here as a bearing with respect to the hollow shaft 11.

24 is the flange for coupling the driven aggregate.

25 is a magnetic disk for determining the rotor position.

31, 32 represent the fixed bearings.

33 is the plus brush.

34 is the minus brush.

35 is a brush for the control (if necessary).

36 is a emitter which acts on the sensor 12.

37 is the simplified representation of a frame closed against the environment which is sealed over one of the bearings 31, 32 so that, the brushes are separated from the environment.

FIG. 1a represents a motor for which the carrier bearings 31, 32 are fixed on both sides of the rotors. According to FIGS. 1b, c the carrier bearings 31, 32 are fixed only on one side. The three motors of FIGS. 1a, b, c can naturally be realized with one of the three alternatives for the arrangement of the bearings 31, 32 of the brushes 33, 34, 35 or of the sensors 12 or of the control emitter 36.

Figure 2:
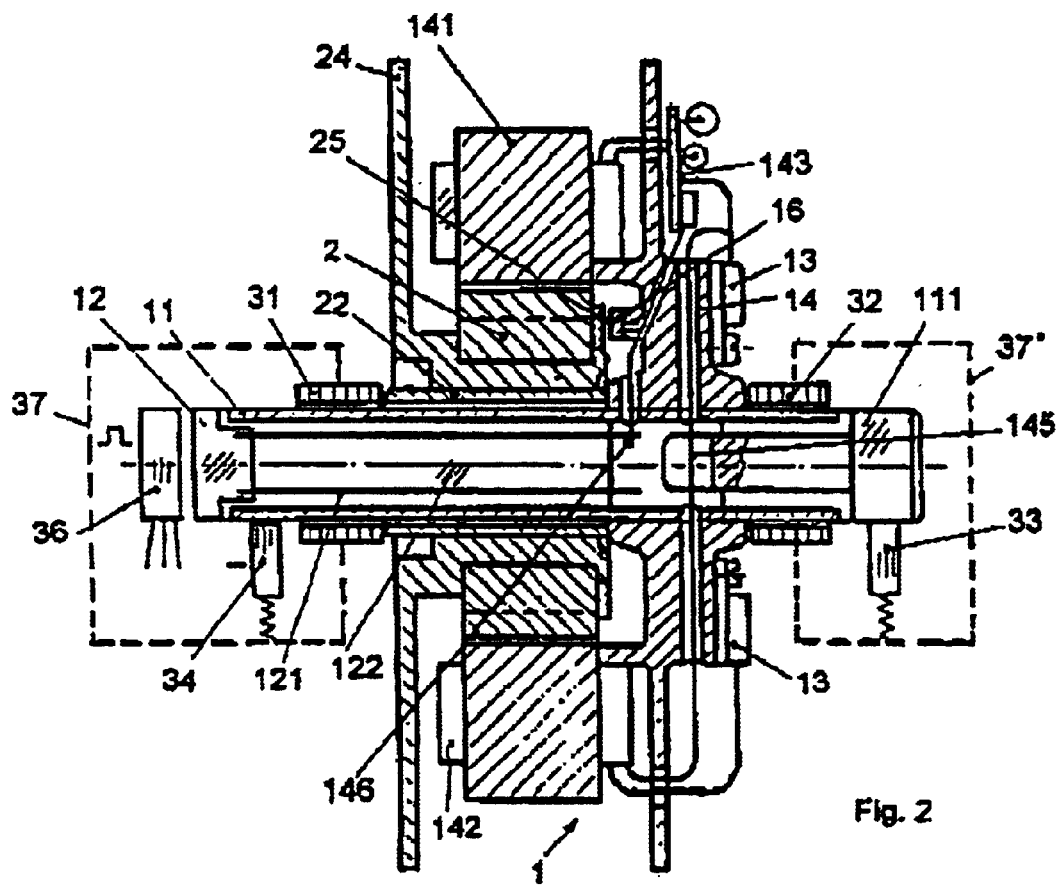
FIG. 2: Shows a more detailed configuration of the basic construction of the opposite motor.

FIG. 2 shows more details of the basic construction of a motor with the following rotor as an inner rotor (FIG. 1a), for example as, for a motor which is known from the application PCI-RO 00012/95. The following rotor 2 which freely rotates with respect to the hollow shaft 11, is fixed on an intermediate plate which extends between the first one and the bearing bush 22 and which ends with a flange 24, what serves for the coupling of the driven object. The rotor 2 also carries a magnetic disk 25 which serves as a transmitter for the relative position of the rotors 1 and 2, the field rotor 1 carrying correspondingly a Hall sensor 16. The field rotor 1 is fixed on the hollow shaft 11 by means of a multifunctional frame 14 which carries the yokes 141 with the windings 142. The driven device is fixed to the outer edge of the frame 14. The windings 142 are connected with the printed board 143, where the connections of the power transistors 13 are also fixed, whereby these transistors use the frame 14 as a cooler, the current flows from the pulse connection of the source of current through the brush 33 which contacts the axial pin 111 which is insulated with respect to the shaft. The pin 111 is drilled and protected so that it acts as a nut part of a plug-in connection (for example FIG. 3a). The radial plug pin 145 traverses it and is insulated against the frame 14 and thus conducts the current from the + connection to the printed board 143. Other alternatives can also be realized, so for example the pin 145 can be first inserted, the pin 111 being then inserted into it. The minus connection of the source of current is connected with the brush 34 which pushes directly onto the shaft 11 which is directly in contact with the frame 14 so that the motor parts are on the minus potential.

With these simply realized connections, the motor is already operative. An abnormal increase of the number of revolutions of the motor, especially of the outer rotor, can be avoided by means of a contact which is fixed on the printed circuit 143 an which is actuated over the centrifugal force when a predetermined number of revolutions is exceeded. Should it be possible to influence the control of the electronics of the motor (printing board 143) in order, for example, to start the motor or to control its power, this can be achieved by means of the sensor 12. This sensor shows for example three connections 111 which are placed in an insulating body. The connections 121 of the sensor 12 which are placed around 120° on a circle are connected with the pins 146 which are insulated with respect to the frame 14, these pins being connected with the printed board.

The insulating body 122 can be produced by injection moulding or by another processing from a thermoplastic or not thermoplastic material. In a simple form, this body can show grooves which receive the connections 121. Here, known rules from the prior art are used in order to realize a safe electric connection between the lamellae 121 and the pins 146. For example, it can be processed so that the pins 146 are inserted (radially) with, an elastic pressure into the lamellae 121 or that the lamellae 121 elastically engage (axially) into the pins 146.

When this is desired, other connection techniques can also be used, for example by means of coaxial tubular lines which lead to slip rings or to the sensor 12, whereby it is thus avoided that the hollow shaft 11 acts as a conductor. Insulated wires can also be drawn through the motor frame 14 and the hollow shaft 11.

Figure 3:
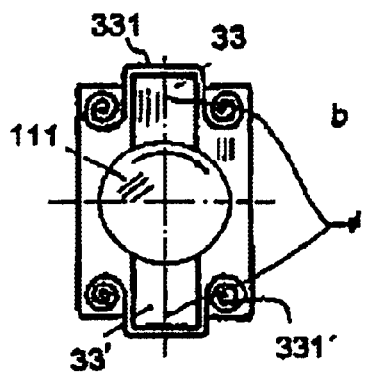
FIG. 3a: Shows axial pin 111 drilled so that it acts as the nut part of the connection with the radial plug pin 145 of FIG. 2.
FIG. 3b: Shows a brush configuration where two brushes 33, 33' are placed symmetrically opposite the pin 111, with each brush being pressed by a double scroll spring 331.

However, the embodiment example according to FIG. 2 is simpler and is appropriate for an automatized assembly. A compact construction alternative for the brush arrangement which is appropriate for high currents is represented in FIG. 3b where two brushes 33 and 33' (or 34, 34') are placed symmetrically opposite the pin 111, their electric connections being switched in parallel and each brush being pressed by a double scroll spring 33.

For the motor control, the emitter 36 transmits contactless control signals to the sensor 12 which acts onto the rotating electronics. The fixed bearings 31 and 32 allow that the shaft 11 freely rotates and take over supporting forces which are caused by the whole opposite arrangement. Both ends of the hollow shaft 11 are situated inside closed spaces 37 and 37', the sealing of the bearings 31, 32 being used for the protection of the brushes and of the unit emitter/receiver, whereby the housings 37, 37' are simultaneously supports of the motor.

Characteristic for these motors with opposite rotors is that they supply the same torque over each of the rotors 1, 2 so that only a negligible friction moment is transmitted onto the support 37, this moment coming from the brushes 33, 35 or the bearings 31, 32.

The dimensioning number of revolutions for the electrics of the motor (the relative number of revolutions or the switching frequency) is the sum of the absolute numbers of revolutions of both rotors 1, 2 all the more since they rotate in opposite direction. The number of revolutions and eventually the power of the motor can be controlled from outside even without the sensor 12, by evaluation of the voltage and of the current on the brushes 33, 34 of the motor as well as over the frequency of the current ripple which can be assigned to the commutation. These parameters can, if necessary, be adjusted by means of electronics which is placed outside the motor, for example in the stationary carrier.

The numbers of revolutions of both rotors 1, 2 can be different and the number of revolutions of an individual rotor can be influenced (for example by changing the number of revolutions/the torque characteristic of the driven device), whereby the torque or the number of revolutions is also modified on the other rotor (2, 1).

These are thus possibilities for controlling both working devices 19, 29 which are driven by the rotors 1 and 2, whereby the commutating frequency and or the ratio of the numbers of revolutions of the rotors can be influenced.

Figure 4:
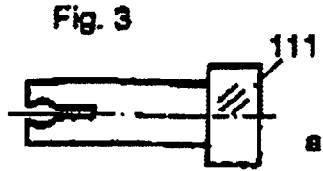
FIG. 4: Shows a four stage a, b, c, d ventilator operated by the opposite motor, a and c being operated by the inner rotor 2 by means of a cylindrical tube 27, and b and d being operated by the outer rotor 1.
Figure 4:
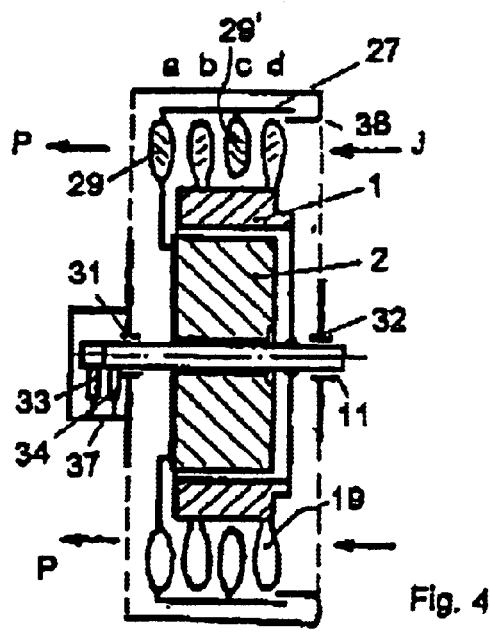

The preferred domain for the application of opposite motors of this invention is the actuation of axial opposite ventilators. The realization possibility of such a ventilator with several stages (four) is shown in FIG. 4. The outer rotor 1 drives two axial ventilator stages b and d with blades 18 which rotate in a direction, the inner rotor 2 driving the stage a or the stage c over the foot of the ventilator blades 29, the stage c being fixed to the stage a over a simultaneously rotating cylindrical tube 27.

The wall (the carrier) 38 which separates the overpressure spaces (P) or the underpressure spaces (J) can be configured as an extension of the housings of the bearings 31, 32 or of the brushes 33, 34. It shows a cylindrical collar in the area of the stage d (air inlet) in order to reduce the losses between the collar and the tube 27.

Figure 5A:
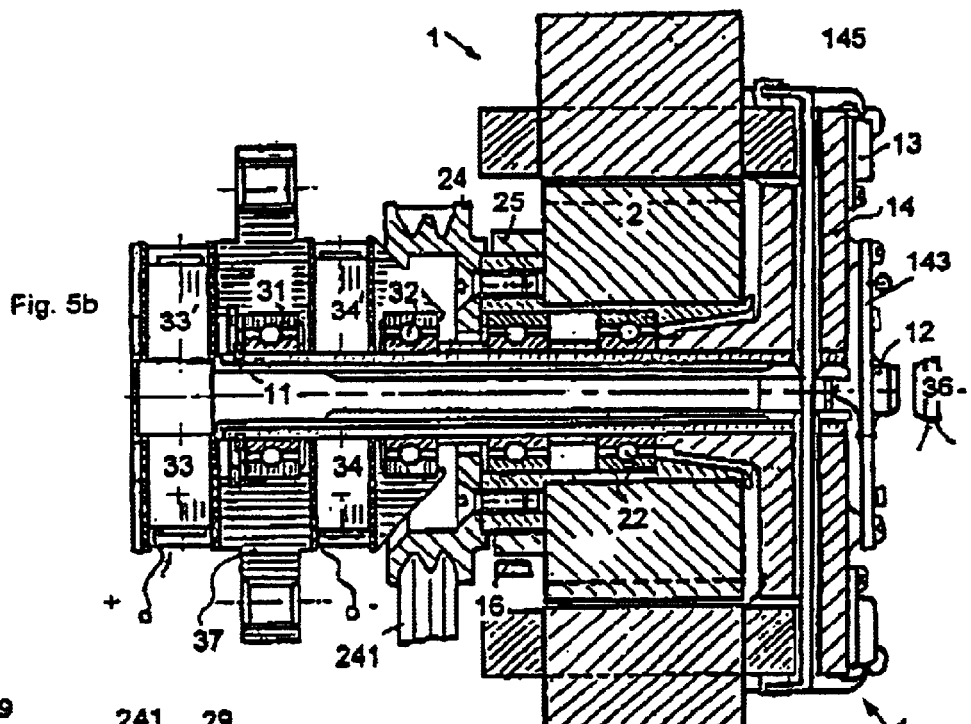
FIG. 5a: Shows the opposite motor with rotor arrangement according to FIG. 1a and with bearing arrangement according to FIG. 1b.

For applications which require a high throughput for a low pressure, the alternative of an opposite motor with two ventilators according to FIGS. 5*a, b* is advantageous (schematic representation and motor cross section).

The motor according to FIG. 5*b* (driving gear arrangement, see FIG. 5*a*) shows the configuration of two rotors as in FIG. 1*a*, the bearing arrangement corresponding to FIG. 1*b*. Here, the outer rotor 1 drives the blades 19 of a ventilator and the inner rotor 2 drives a laterally offset placed ventilator 29 by means of the belt 241 so that both ventilators work parallel the one besides the other. The transmission ratio of the belt drive 241 driven by the inner rotor 2 over the belt wheel (flange) 24 can be 1:1 or be different and, if necessary, can even be changed so that additional control possibilities could be achieved. The remaining parts are designated as in FIG. 1. The ratio of the powers required by the two ventilators can be obtained by changing the ventilator characteristic by known methods.

Figure 5A:
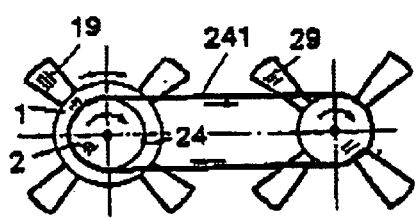

If we consider that both torques are the same, the operating point of each ventilator can be determined. The two ventilators can be placed in the same plane (FIG. 5) or in different planes.

Figure 6:
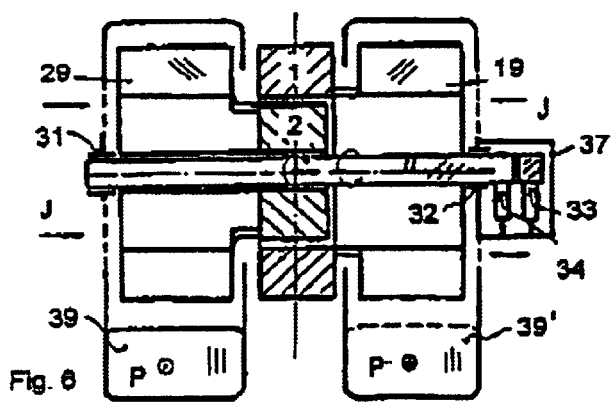
FIG. 6: Shows the configuration of the opposite motor operating two radial blowers 19 and 29, each one with a spiral housing.
Figure 7:
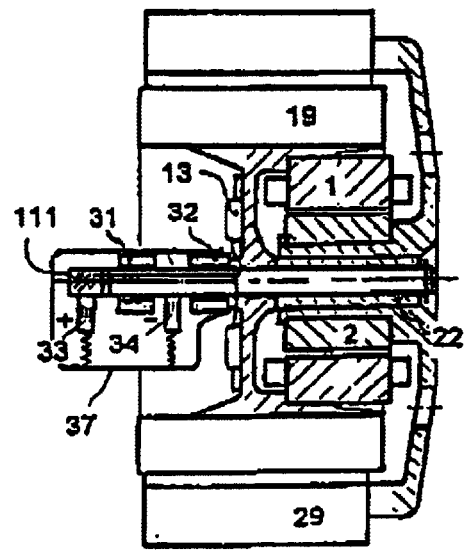
FIG. 7: Shows a radially concentrical blower unit with one blower wheel 19 being placed inside the other 29.

FIG. 6 shows two radial blowers 19, 29, each one with a spiral blower, which are driven by the rotors 1 and 2 according to the invention. In FIG. 7, there is an alternative with two radially concentrical blowers 19, 29 which are driven by the rotors 1, 2, the one blower wheel being placed inside the other. This type does not require any spiral housing, air being blown in radial direction. The invention allows the realization of economically easy and efficient motor/blower units by simple technological methods.

What is claimed is:

1. Electronically switched direct current motor which has a winding carrying field rotor with switching electronics which produces a rotary field which acts onto a following rotor, whereby the current transmission takes places from a stationary carrier on the field rotor 1 by a hollow shaft 11, characterized in that at least one of the current conducting slip rings (111) with at least one corresponding brush (33) is situated at the end of the hollow shaft (11) so that at least one fixed bearing (32) is situated between the rotors (1, 2) and the system slip ring (111)/brush (33) and that this system (111, 33) can be protected against the environment with a housing (37) which is sealed over the bearing (32).

2. A motor according to claim 1, characterized in that the field rotor (1) or the following rotor (2) can be configured as an inner, a lateral or an outer rotor.

3. A motor according to claim 1 or 2, characterized in that the fixed bearings (31, 32) can be fixed on one or on both sides of the rotors (1) and/or (2).

4. A motor according to any one of the claims 1 to 3, characterized in that the current transmission is carried out, for example, from the minus connection or from th brush (34) through the hollow shaft (11) of the motor or through its frame (14).

5. A motor according to any one of the claims 1 to 4, characterized in that it has a sensor (12) for the contactless transmission of control signals.

6. A motor according to any one of the claims 1 to 5, characterized in that the sensor is fixed to one end of the shaft.

7. A motor according to any one of the claims 1 to 6, characterized in that the conducting of the high-voltage lines (111, 145) and eventually of the control current lines (121) takes place through the hollow shaft (11) of the motor.

8. A motor according to any one of the claims 1 to 7, characterized in that the transmission of the currents takes place through the hollow shaft (11) to the electronics of the motor (143, 144) over plug-type connections between the axial conductors (111, 121) and the radial conductors (145, 146), whereby the latter can be inserted radially in the first ones or vice-versa by inserting the axial components (111, 121) as last ones.

9. A motor according to any one of the claims 1 to 8, characterized in that the hollow shaft (111) and the motor frame (14) serve as current lines, a brush (34) making an electrical sliding contact to the hollow shaft (11).

10. A motor according to any one of the claims 1 to 9, characterized in that the transmission of the signals through the shaft (11) takes place with coaxial lines.

11. A motor according to any one of the claims 1 to 10, characterized in that the protection against dangerous numbers of revolutions takes place by a centrifugal force actuated contact.

12. A motor according to any one of the claims 1 to 11, characterized in that the control of its number of revolutions takes places by means of stationary electrical devices, the alternating component of the drawn current before the brushes (33, 34) serving as control parameters.

13. A motor according to any one of the claims 1 to 12, characterized in that the ratio of the powers delivered by the field rotor (1) or the following rotor (2) takes place by changing the number of revolutions/torque characteristic of the devices driven by the mentioned rotors.

14. A motor according to any one of the claims 1 to 13, characterized in that it drives a two stage or multiple-stage axial blower so that one of the rotors (1, 2) drives at least one ventilator (19) on the inner diameter of the blades, the other rotor (2, 1) driving an opposite rotating ventilating (29), a tubular shoulder (29') extending from its blade tips which drives at least one further ventilator (26) rotating in the same direction over its blade tips.

15. A motor according to any one of the claims 1 to 14, characterized in that it has a fixed laterally mounted carrier (37) which is configured in the art of a suction opening which has a sealing collar (38) which cooperates with the cylindrical ventilator driving tube (27).

16. A motor according to any one of the claims 1 to 15, characterized in that one of the rotors (1, 2) directly drives the blades of a ventilator (19), whereby the other rotor (2) drives a further ventilator (29) over a driving gear with a fixed or variable transmission ratio (241) which is placed outside the exhaust air flow of the first ventilator.

17. A motor according to any one of the claims 1 to 13, characterized in that its rotors (1, 2) drives two radial blowers (19, 29) independent from each other.

18. A motor according to any one of the claims 1 to 13, characterized in that its rotors (1, 2) drives concentrical radial blowers.

19. A motor according to any one of the claims 1 to 18, characterized in that the brushes (33, 34) are configured as double brushes, are placed for example opposite along a diameter, whereby they are pressed on the slip rings (11, 111) by double scroll springs (331) produced from a band.

* * * * *